United States Patent Office 3,167,570
Patented Jan. 26, 1965

3,167,570
PROCESS FOR THE MANUFACTURE OF ESTERS OF HYDROXY-ALKANE-SULFO-ACIDS
Johann Bohunek, Burgkirchen (Alz), Germany, assignor to Farbwerke Hoechst Aktiengesellschaft vormals Meister Lucius & Brüning, Frankfurt am Main, Germany, a corporation of Germany
No Drawing. Filed Dec. 7, 1961, Ser. No. 157,857
Claims priority, application Germany, Dec. 15, 1960, F 32,765
5 Claims. (Cl. 260—400)

The present invention relates to a process for the manufacture of esters of hydroxy-alkane-sulfo-acids.

It is known that esters of hydroxy-alkane-sulfo-acids with higher fatty acids can be prepared by reacting fatty acid chlorides at temperatures above 200° C. with dry salts of hydroxy-alkane-sulfo-acids. In spite of the relatively high temperatures, these reactions produce the desired esters in poor yields and unsatisfactory quality even when long reaction periods and great excesses of the reactants are used. To avoid these deficiencies, it has been proposed to react in the manner described above the carboxylic acids in the form of their mixed anyhdrides with boric acid. The results obtained, however, do not justify such procedure. A still further disadvantage involved in this modification is the undesired incorporation of borates in the final product. Attempts have also been made to slightly reduce the high reaction temperatures by the addition of an oxygen acid of phosphorus. These attempts were unsatisfactory also. In other words, no simple and economic process for the manufacture of these interesting esters has hitherto been proposed.

The present invention provides a simple and economical process for making esters of hydroxy-alkane-sulfo-acids with carboxylic acids, wherein an alkali metal salt of a hydroxy-alkane-sulfo-acid is mixed with a carboxylic acid, the resulting mixture is heated at temperatures of 150–200° C., preferably 160–180° C. while introducing so much gaseous hydrogen chloride that a saturated aqueous hydrochloric acid distils off the reaction mixture.

In this reaction, the hydrogen chloride introduced obviously splits a relatively small proportion of the hydroxy-alkane-sulfo-acid salt with the formation of free hydroxy-alkane-sulfo-acid and the corresponding metal chloride. The hydroxy-alkane-sulfo-acid set free mixes with the carboxylic acid and is thereby immediately esterified. The metal chloride, e.g. sodium chloride, is again split by the sulfo-acid formed with liberation of hydrogen chloride and reformation of the metal sulfonate group. In other words, the components of the reaction mixture are brought into the state of dynamic equilibrium which suffices to ensure within a short period of time (about 1–3 hours) substantial esterification without electrolytes being incorporated into the final product. When salts of 2-hydroxy-ethane-sulfo-acids are used, the initially thinly liquid reaction mixture is transformed as the reaction proceeds into a continuously thickening melt and finally into a pasty-crumbly state. With the use of the higher salts of 2-hydroxy-alkane-sulfo acids, for example the salts of 2-hydroxy-propane-sulfo-acid and 2-hydroxy-butane-sulfo-acid, the initially thin melt thickens slightly and then assumes as the reaction proceeds a readily stirrable form. The fatty acid ester is obtained neutral or slightly acid which may even subsequently be neutralized, if desired.

The starting materials, i.e. salt of hydroxy-alkane-sulfo-acid and carboxylic acid, are advantageously combined with intense mechanical stirring, for example with the aid of a stirrer, vibro-mixer or the like, and the resulting mixture maintained during esterification in the state of intense mechanical motion. It has also been found advantageous to admix the hydrogen chloride with an inert gas, e.g. nitrogen or carbon dioxide, which favors the elimination of condensed water and avoids harmful, oxidative side reactions. The reaction is advantageously carried out in a manner such that corresponding to the rate of hydrogen chloride absorbed smaller and smaller proportions of hydrogen chloride are introduced until towards the end of the reaction inert gas alone is introduced. When the distillation has substantially ceased, it is advantageous for terminating the esterification to reduce the pressure down to about 3 mm. mercury. More advantageously, the reaction will be terminated when the whole amount of water set free by the condensation of the esters has been removed from the reaction mixture. The amount of hydrogen chloride to be used in the reaction is preferably between ¼ and 1 mol per mol fatty acid used. ⅓ mol will be sufficient in most cases.

Typical hydroxy-alkane-sulfo-acids which can be esterified by the process of this invention include inter alia: monohydroxy-alkane-sulfo-acids which preferably contain 1 to 10 carbon atoms, more especially straight-chained 2-hydroxy-alkane-sulfo-acids, such as 2-hydroxy-ethane-sulfo-acid, 2-hydroxy-propane-sulfo-acid, 2-hydroxy-butane-sulfo-acid, 2-hydroxy-hexane-sulfo-acid, 2-hydroxy-decane-sulfo acid, and the like. The alkane groups of the sulfo-acids may be branched and contain the hydroxy- and sulfo-acid groups attached to any carbon atom. This means that compounds of the formula:

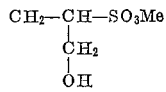

may also be esterified, for example.

The hydroxy and sulfo-acid group may also appear several times in the molecule. Still further, hydroxy-alkane-sulfo-acids may be used whose alkane groups carry substituents inert under the reaction conditions, e.g. phenyl radicals or nitro groups, for example the following compounds:

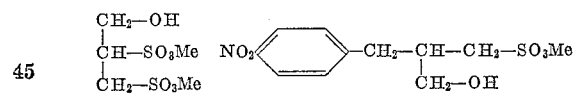

The hydroxy-alkane-sulfo-acids are used in the form of their alkali metal or alkaline earth metal salts, the sodium salts being preferred. It is obvious that salts of other alkali metals or alkaline earth metals, for example the salts of lithium, potassium, calcium or mangesium, may also be used.

Typical of carboxylic acids that can be used are all aliphatic and araliphatic, straight-chained or branched carboxylic acids of appropriate constitution, e.g. acetic acid, butyric acid or isovaleric acid, or more especially the higher fatty acids having 8–22 carbon atoms in the molecule, such as iso-octanoic acid, undecanoic acid, lauric acid, palmitic acid, stearic acid, oleic acid, arachic acid, behenic acid or phenylacetic acid; polybasic acids, such as maleic acid, succinic acid, adipic acid, sebacic acid may also be used. Still further, there may be employed carboxylic acid mixtures which can be obtained, for example, from natural products, such as tallow, coconut oil, or by oxidation of paraffin mixtures (paraffin gatsch). More generally, carboxylic acids which are liquid at the esterification temperature are preferably used. The carboxylic acids may carry reaction-inert substituents.

The esters of hydroxy-alkane-sulfo-acids with carboxylic acids are valuable surface active substances.

The following examples serve to illustrate the inven-

EXAMPLE 1

208 parts (1 mol) coconut fatty acid were mixed with 148 parts (1 mol) of the dry, pulverulent sodium salt of 2-hydroxy-ethane-sulfo-acid, the resulting mixture was heated at 160° C., while stirring, and gaseous hydrogen chloride was introduced at a rate such that the total amount of gas supplied was absorbed by the reaction mixture. After a relatively short period of time, the mass became more thinly liquid and more homogeneous and aqueous hydrochloric acid began to distil off. The supply of gaseous hydrogen chloride was continued until the reaction mixture ceased to absorb gas and the distillation came to a standstill. The temperature was then raised to 170° C. and reaction water still present was removed from the reaction mixture by distillation under reduced pressure. 335 parts of the coconut fatty acid ester of 2-hydroxy-ethane-sulfo-acid were obtained in the form of a light, crumbly powder which dissolved in water to give a clear solution and was substantially free from electrolyte.

EXAMPLE 2

268 g. stearic acid were heated to 180° C. together with 150 g. of the sodium salt of 2-hydroxy-ethane-sulfo-acid and a mixture of 30 l. nitrogen and 20 g. hydrogen chloride was introduced per hour for a total period of 3 hours, while stirring. The initially thinly liquid mass became thicker and thicker and could finally no longer be stirred. The pressure was reduced to 15 mm. mercury to distil off volatile substances, if any. About 400 g. of the stearic acid ester of 2-hydroxy-ethane-sulfo-acid were obtained in the form of a white product which dissolved in water to a clear solution and which could readily be transformed into powder form.

EXAMPLE 3

208 g. coconut fatty acid and 170 g. of the sodium salt of 2-hydroxy-propane-sulfo-acid were treated for 30 minutes at 175° C. with a gas mixture of 30 l. nitrogen and 20 g. hydrogen chloride per hour and then for 90 minutes with a gas mixture of 30 l. nitrogen and 5 g. hydrogen chloride per hour, and subsequently 30 l. nitrogen were introduced alone for 2 hours. Towards the end of the reaction, the pressure was reduced to 5 mm. mercury until distillation ceased. The reaction product obtained, i.e. the coconut fatty acid ester of 2-hydroxy-propane-sulfo-acid, was thinly liquid and solidified to become a pulverizable mass which dissolved in water to give a clear solution.

I claim:

1. A process for the manufacture of metal salts of an ester of hydroxy-alkane-sulfo-acids with carboxylic acids comprising mixing a carboxylic acid with a metal salt of a hydroxy-alkane-sulfo-acid, said metal being selected from the group consisting of alkali and alkaline earth metals, passing gaseous hydrogen chloride through the mixture, heating the carboxylic acid and the metal salt of the hydroxy-alkane-sulfo-acid to a reactive temperature range of 150 to 200° C. while the stream of gaseous hydrogen chloride is passed through the mixture until substantially the total stoichiometric amount of water formed by ester condensation has distilled off in the form of dilute aqueous hydrochloric acid, the amount of gaseous hydrogen chloride introduced being calculated substantially to replace the amount of hydrogen chloride carried off in the distillate, and the carboxylic acid ester salt of the hydroxy-alkane-sulfo-acid is collected as the electrolyte-free distillation residue.

2. The process of claim 1, wherein the esterification is carried out at temperatures between 160 and 180° C.

3. The process of claim 1, wherein the hydroxy-alkane-sulfo-acid is used in the form of its sodium salt.

4. The process of claim 1, wherein the hydrogen chloride used is diluted with an inert gas.

5. A process for the manufacture of sodium salts of an ester of hydroxy-alkane-sulfo-acids with carboxylic acids, comprising mixing a carboxylic acid with a sodium salt of a hydroxy-alkane-sulfo-acid, heating said mixture in the temperature range of 150 to 200° C. to react the acid and salt, and introducing gaseous hydrogen chloride during said heating step until substantially the total stoichiometric amount of water formed from the ester condensation has distilled off in the form of dilute aqueous hydrochloric acid, the amount of gaseous hydrogen chloride being calculated substantially to replace the loss of hydrogen chloride carried away in the distillate, the carboxylic acid ester salt of the hydroxy-alkane-sulfo-acid being obtained as the distillation residue free from electrolytes.

References Cited in the file of this patent
UNITED STATES PATENTS

| | | |
|---|---|---|
| 1,881,172 | Daimler et al. | Oct. 4, 1932 |
| 3,029,264 | Van Alphin | Apr. 10, 1962 |